United States Patent
Joly et al.

(10) Patent No.: US 9,726,575 B2
(45) Date of Patent: Aug. 8, 2017

(54) SUPPORT FOR AN ELECTRONIC MODULE OF A PRESSURE MEASUREMENT SENSOR

(71) Applicants: CONTINENTAL AUTOMOTIVE FRANCE, Toulouse (FR); CONTINENTAL AUTOMOTIVE GmbH, Hannover (DE)

(72) Inventors: Matthieu Joly, Rabastens (FR); Cyrille Patri, Villeneuve Tolosane (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 217 days.

(21) Appl. No.: 14/798,497

(22) Filed: Jul. 14, 2015

(65) Prior Publication Data
US 2016/0033365 A1 Feb. 4, 2016

(30) Foreign Application Priority Data

Jul. 31, 2014 (FR) ..................................... 14 57416

(51) Int. Cl.
*G01L 23/10* (2006.01)
*G01M 15/08* (2006.01)
(Continued)

(52) U.S. Cl.
CPC ............ *G01M 15/08* (2013.01); *G01L 19/148* (2013.01); *G01L 23/08* (2013.01); *G01L 23/10* (2013.01);
(Continued)

(58) Field of Classification Search
CPC ....................................................... G01L 23/10
(Continued)

(56) References Cited

U.S. PATENT DOCUMENTS

| 7,726,269 B2 * | 6/2010 | Ramond ................. F23Q 7/001 123/143 R |
| 2010/0192696 A1 * | 8/2010 | Schlitzkus ............ G01L 19/148 73/756 |

(Continued)

FOREIGN PATENT DOCUMENTS

| EP | 2620757 | 7/2013 |
| EP | 2711631 | 3/2014 |

(Continued)

OTHER PUBLICATIONS

Institut National De La Propriete Industrielle, Rapport de Recherche Preliminaire, Support for an Electronic Module of a Pressure Measurement Sensor, INPI, Apr. 16, 2015, 2 pages.*

(Continued)

*Primary Examiner* — Clayton E Laballe
*Assistant Examiner* — Kevin Butler
(74) *Attorney, Agent, or Firm* — Young & Thompson

(57) ABSTRACT

A support (17) for an electronic module (7) for generating a signal, this module being intended to be inserted into a sensor (1) for measuring the pressure of the gases contained in a vehicle cylinder, the support (17) including a portion (19) for receiving the electronic module (7) and elements (25) for retaining the electronic module (7) on the receiving portion (19), the electronic module (7) including a body (8), the receiving portion (19) including elements (31a, 31b) for attaching the retaining elements (25), and the retaining elements (25) being configured to pivot between an open position (PO) in which the electronic module (7) can be placed on the receiving portion (19) and a closed position in which the retaining elements (25) are attached to the attachment elements (31a, 31b) in order to retain the body (8) of the electronic module (7) on the support (17).

10 Claims, 3 Drawing Sheets

(51) Int. Cl.
  *G01L 19/14*  (2006.01)
  *G01L 23/18*  (2006.01)
  *G01L 23/16*  (2006.01)
  *G01L 23/22*  (2006.01)
  *G01L 23/08*  (2006.01)
(52) U.S. Cl.
  CPC .............. *G01L 23/16* (2013.01); *G01L 23/18* (2013.01); *G01L 23/22* (2013.01)
(58) Field of Classification Search
  USPC ............................................................ 73/18
  See application file for complete search history.

(56) References Cited

U.S. PATENT DOCUMENTS

| | | | | |
|---|---|---|---|---|
| 2014/0352415 A1* | 12/2014 | Groenhuijzen | ....... | F02B 77/085 |
| | | | | 73/114.18 |
| 2016/0033365 A1* | 2/2016 | Joly | ...................... | G01L 19/148 |
| | | | | 73/114.18 |

FOREIGN PATENT DOCUMENTS

| | | |
|---|---|---|
| JP | 08261857 | 10/1996 |
| JP | 2012181127 | 9/2012 |
| WO | 2009007286 | 1/2009 |

OTHER PUBLICATIONS

French Search Report, dated Apr. 16, 2015, from corresponding French application.

\* cited by examiner

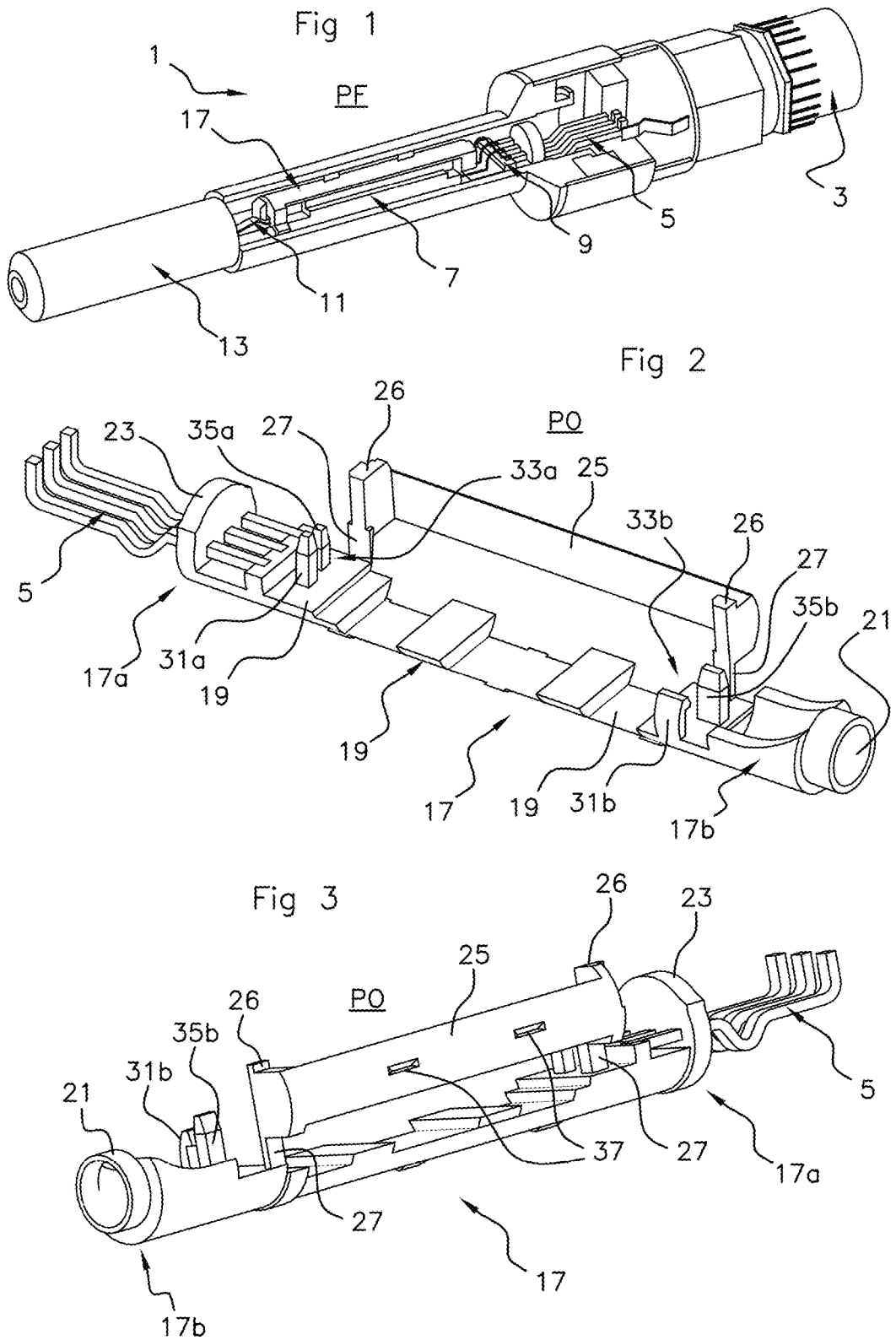

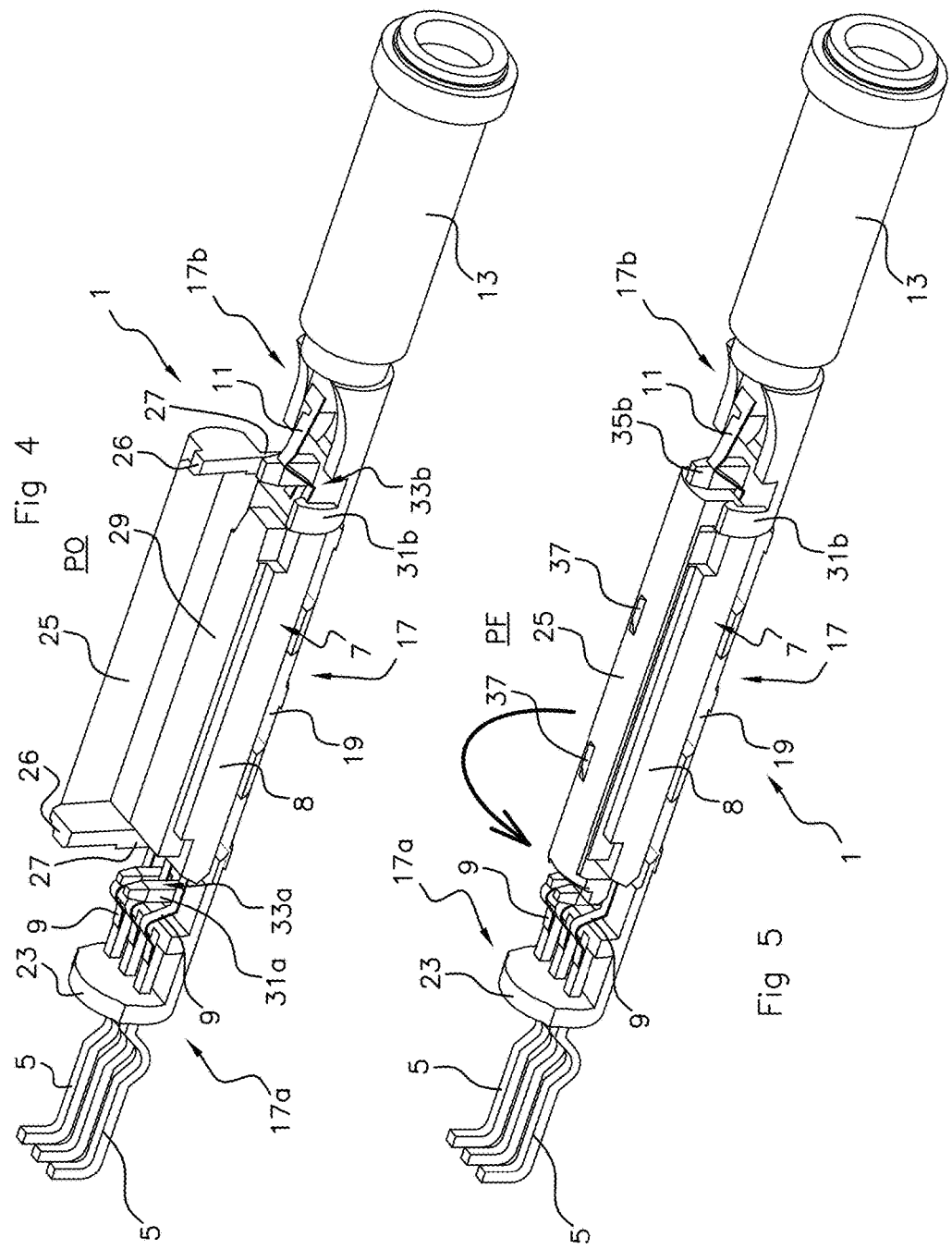

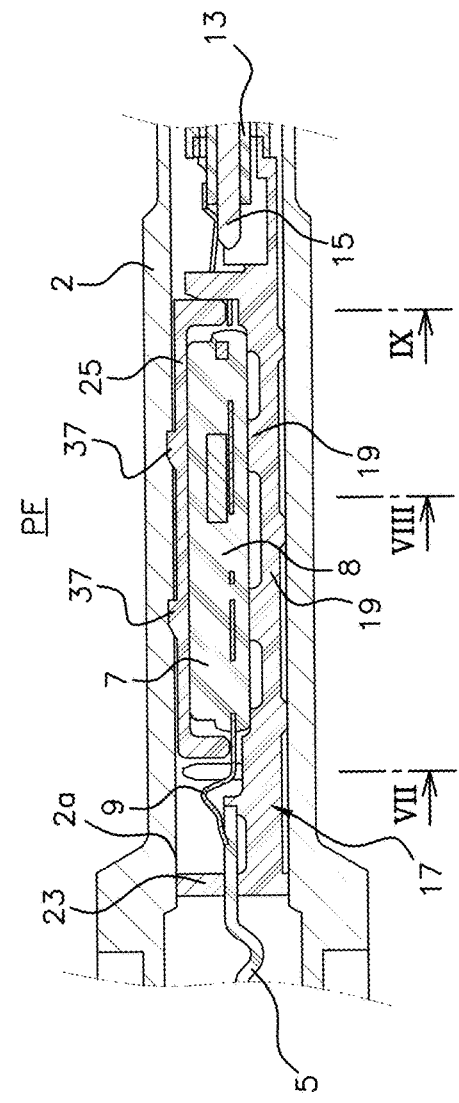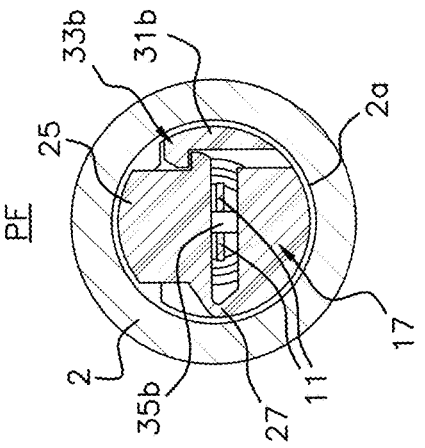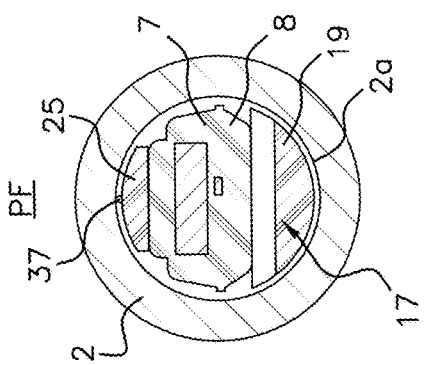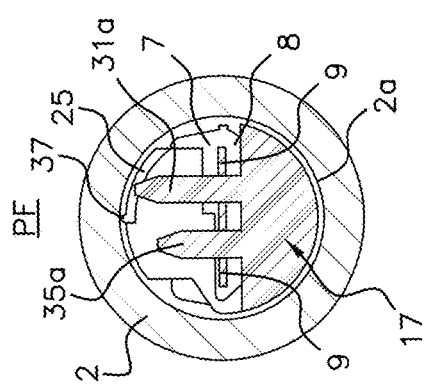

SUPPORT FOR AN ELECTRONIC MODULE OF A PRESSURE MEASUREMENT SENSOR

FIELD OF THE INVENTION

The invention is more particularly applicable in the field of pressure measurement sensors mounted on the engine cylinders of vehicles, notably motor vehicles.

BACKGROUND OF THE INVENTION

In a motor vehicle comprising cylinders each closed by a cylinder head for fuel combustion, there is a known way of mounting a sensor through the head of each cylinder for measuring the pressure of the gases in said cylinder.

A sensor of this type measures the pressure of the gases in the cylinder and generates a signal representing the values of this pressure over time. This signal is sent to a processing module of the vehicle so that various parameters of the vehicle can be controlled. Thus, for example, the signal delivered by the sensor can be used to improve the use of the engine and reduce pollutant emission, or alternatively to inject a specified amount of fuel into the cylinder at the appropriate moment.

This pressure measurement sensor comprises, in a known way, a cylindrical body of elongate shape, at the end of which a probe extends into the interior of the cylinder for measuring the pressure of the gases in the cylinder.

In order to produce an analog signal representing the pressure values of the gases measured by the probe inside the cylinder, an electronic module is mounted inside the body and is connected by a plurality of pins to the probe on the one hand, and, on the other hand, to an electrical cable which connects it to the processing module in order to send generated signal to it.

In order to position the electronic module in the body of the sensor, there is a known way of using a support made of plastic material, to which the electronic module is initially attached before it is inserted into the body of the sensor, after which the probe is mounted at one end of the body and the electrical cable is mounted at its other end.

In the existing solutions, the electronic module is attached to the support either by gluing or by inserting the pins for connection to the electrical cable under lateral strips made in one piece with the support.

Attachment by gluing may prove to be complicated, costly and time-consuming, since there is little room for inserting the adhesive, it is difficult to withdraw the electronic module from the support subsequently for repair, and gluing in this way requires a costly, complex industrial process, which has a number of disadvantages.

The insertion of the pins of the electronic module under strips may cause breakage of the pins if the sensor is subjected to vibrations of the cylinder during operation, which is a major disadvantage.

The aim of the present invention is to overcome these disadvantages by proposing a solution for attaching the electronic module which is simple, reliable and effective.

SUMMARY OF THE INVENTION

For this purpose, the invention relates, in the first place, to a support for an electronic module for generating a signal, this module being intended to be inserted into a sensor for measuring the pressure of the gases contained in a vehicle cylinder, said support comprising a portion for receiving said electronic module and means for retaining the electronic module on said receiving portion, the electronic module comprising a body, the support being remarkable in that the receiving portion comprises means for attaching said retaining means, and in that the retaining means are configured to pivot between an open position in which the electronic module can be placed on the receiving portion and a closed position in which the retaining means are attached to the attachment means in order to retain the body of the electronic module on the support.

The retaining means and the attachment means thus have a closing function, enabling the electronic module to be attached easily and securely to the support. Consequently there is no need to use an adhesive or to retain the pins of the electronic module in a complicated manner.

Preferably, the retaining means comprise at least one cover configured to come into contact with a wall of an electronic module. This cover enables the electronic module to be held securely on the support in order to reduce the risk of damage that may occur as a result of vibrations acting on a sensor in which the support is mounted.

Preferably, the retaining means comprise a single cover in order to increase the strength and the retention of the electronic module while allowing easy and rapid movement of the cover between the open and the closed position and vice versa.

Advantageously, this cover covers most of the contact wall of the electronic module, with the aim of providing additional protection of said module from the environment, and of locking the electronic module to the support more firmly.

Advantageously, the retaining means are made in one piece with the support, making it possible to manufacture the support easily and limit the number of mechanical parts, thus reducing its manufacturing cost.

According to a characteristic of the invention, the attachment means comprise at least one lug having a protrusion for securing the retaining means, which is simple to manufacture while being effective and strong.

According to another characteristic of the invention, the attachment means are made in one piece with the support, making it possible to manufacture the support easily and limit the number of mechanical parts, thus reducing its manufacturing cost.

In a preferred embodiment of the invention, the retaining means comprise at least one rib, or preferably two ribs, arranged so as to lock the support in a body of a sensor. One or more locking ribs enable the support to be locked rapidly and easily in such a way that no other operation is required to lock the support.

Advantageously, the rib is made in one piece with the retaining means, making it possible to manufacture the support easily and limit the number of mechanical parts, thus reducing its manufacturing cost.

According to one aspect of the invention, the support comprises means for positioning the electronic module, enabling the electronic module to be mounted easily and rapidly onto the support.

Preferably, the electronic module positioning means are made in one piece with the support, making it possible to manufacture the support easily and limit the number of mechanical parts, thus reducing its manufacturing cost.

According to one characteristic of the invention, the positioning means comprise at least one spike which enables the electronic module to be positioned simply and effectively.

Preferably, the spike is configured to guide pins of an electronic module to be mounted on the support, thus providing a locating function.

In one embodiment of the support according to the invention, the retaining means are re-usable. In other words, the retaining means can be detached from the attachment means, for the maintenance or replacement of the electronic module for example, and then attached again to the attachment means, to fix the electronic module to the support.

In a variant, the retaining means can be joined permanently to the attachment means. In this case, a change of the electronic module requires a change of the support to which the electronic module is attached.

The invention also relates to a pressure measurement sensor for a vehicle cylinder, said sensor comprising a support as described above and an electronic module for generating a pressure signal, mounted on said support between the retaining means and the receiving portion.

The invention also relates to a vehicle comprising an engine, at least one cylinder and at least one sensor for measuring the pressure of the gases contained in said cylinder as described above.

BRIEF DESCRIPTION OF THE DRAWINGS

Other characteristics and advantages of the invention will be apparent from the following description which refers to the attached drawings, provided by way of non-limiting examples, in which identical references are given to similar objects.

FIG. 1 is a partial schematic transparent perspective view of a pressure measurement sensor according to the invention.

FIG. 2 is a first perspective view of an embodiment of the support according to the invention.

FIG. 3 is a second perspective view of the embodiment of FIG. 2.

FIG. 4 is a partial perspective view of the sensor of FIG. 1, with the cover of the support in the open position.

FIG. 5 is a partial perspective view of the sensor of FIG. 1, with the cover of the support in the closed position.

FIG. 6 is a partial view in longitudinal section of the sensor of FIG. 1.

FIG. 7 is a first view in cross section of the sensor of FIG. 6.

FIG. 8 is a second view in cross section of the sensor of FIG. 6.

FIG. 9 is a third view in cross section of the sensor of FIG. 6.

DETAILED DESCRIPTION OF THE INVENTION

FIG. 1 shows a pressure measurement sensor 1 according to the invention. This pressure measurement sensor 1 is intended to be used in a known way for measuring the pressure of the gases contained in a cylinder of a vehicle, notably a motor vehicle. In the position of use, the pressure measurement sensor 1 can be positioned in an opening passing through a wall of the cylinder head which closes the cylinder, or through a wall of the cylinder itself.

As shown in FIG. 1, the sensor 1 comprises a body 2 of elongate shape, at least partially cylindrical, made of plastic material for example, at the end of which is mounted an axial connector 3 connected electrically, on the one hand, to a signal processing module (not shown) and, on the other hand, via three metal communication pins 5, to an electronic module 7 for pressure measurement.

In this example, the electronic module 7 is configured to measure, in a known way, the pressure of the gases in a vehicle cylinder.

For this purpose, the electronic module 7 comprises a body 8, which in this example is substantially parallelepipedal in shape and has, on the one hand, three pins 9 for connection to the axial connector 3 and, on the other hand, two measurement pins 11 for connecting the electronic module 7 to a detection module 13.

Each of the connecting pins 9 is connected to a communication pin 5, by soldering for example, and, similarly, each of the measurement pins 11 is connected to a connector 15 (with reference to FIG. 6) of the detection module 13.

The detection module 13 is a sensitive element for detecting the variations of the pressure of the gases contained in a cylinder on which the sensor is mounted.

For this purpose, the detection module 13 may, for example, comprise in a known way a membrane coupled to a piezoelectric element which supplies the variations of pressure of the gases contained in the cylinder.

The electronic module 7 is then configured to generate an analog signal on the basis of the pressure variations measured by the detection module 13, and to supply this to the processing module via the axial connector 3 and a cable (not shown).

The processing module, which may be the electronic control unit (known to those skilled in the art by the name of "Electronic Control Unit" or ECU in the English language) uses the signal generated by the electronic module 7 to control some of the parameters of the engine of the vehicle.

By way of example, this signal delivered by the sensor can be used to optimize the operation of the cylinder and thus reduce emissions of polluting gases, or alternatively to inject a suitable dose of fuel into the cylinder at the appropriate moment.

The electronic measurement module 7 is mounted on a support 17 shown in FIGS. 1 to 9. This support 17, made of a plastic material in this example, has an elongate shape so that it can be inserted into a cylindrical portion of the body 2 of the sensor 1, as shown in FIG. 1.

As shown in FIG. 2, the communication pins 5 are mounted side by side at a first end 17a of the support 17, so as to be connected to the axial connector 3 as shown in FIG. 1.

The support 17 comprises a portion 19 for receiving the electronic measurement module 7 and a second end 17b comprising, as shown in FIG. 3, an annular portion 21 for mounting the detection module 13 as shown in FIGS. 4 to 6.

In order to lock the ends 17a and 17b of the support 17 against the inner wall 2a of the cylindrical portion of the body 2 in which it is mounted, the first end of the support 17 comprises a locking portion 23 having a cross section which is at least partially circular, the diameter of which is slightly smaller than the diameter of said cylindrical portion, so as to allow the locking of the support 17.

According to the invention, the support comprises means for retaining the electronic module 7 on the receiving portion 19, and the receiving portion comprises means for attaching said retaining means.

The retaining means are configured to pivot between an open position PO, shown in FIG. 4, in which the electronic module can be placed on the receiving portion, and a closed position PF, shown in FIG. 5, in which the retaining means are attached to the attachment means.

In the example shown in the figures, the retaining means take the form of a cover 25 made in one piece with the support 17 and connected to the receiving portion of the electronic module 7 by two connecting lugs 27.

In the closed position, the cover 25 comes into contact with a wall 29 of the electronic module 7 so as to cover most of this wall 29, in order to retain the electronic module 7 securely.

In this example, the cover 25 comprises protrusions 26 for connection to the attachment means.

As shown in FIGS. 2 to 9, the attachment means in this example comprise two catch lugs 31a and 31b made in one piece with the receiving portion 19 of the support 17, each comprising a protrusion 33a and 33b respectively for retaining the catch protrusions 26 of the cover 25.

As shown, notably, in FIGS. 4, 5 and 7, the catch lug 31a located near the first end 17a of the support 17 performs a second function of positioning the connecting pins 9 of the electronic module 7. More precisely, the catch lug 31a can be used to position the connecting pins 9 and therefore the electronic module 7.

The support 17 further comprises means for positioning the electronic module 7, taking the form, in this example, of two positioning spikes 35a and 35b made in one piece with the support 17.

In order to lock the cover 25 against the inner cylindrical wall of the body 2, the cover 25 comprises two ribs 37 made in one piece with the cover 25. These ribs 37 have a beveled profile on the side of the first end 17a of the support 17, to facilitate the insertion of the support 17 into the cylindrical portion of the body 2.

With reference to FIG. 4, during the assembly of the sensor 1, the electronic module 7 is initially placed on the receiving portion 19 of the support 17, the cover 25 being in the open position PO, and the detection module 13 being mounted on the second end 17b of the support 17.

During this operation, the connecting pins 9 are guided by the catch lug 31a and by the positioning spike 35a, while the measurement pins 11 are guided by the positioning spike 35b.

When the electronic module 7 has been positioned on the receiving portion 19 of the support 7, the connecting pins 9 and the measurement pins 11 can be welded, by pulsed laser welding for example, to the communication pins 5 of the support 17 and to the connectors 15 of the detection module 13, respectively.

The cover 25 is then pivoted into a closed position PF in which the connecting protrusions 26 of the cover 25 are engaged by the retaining protrusions 33a and 33b of the catch lugs 31a and 31b respectively, of the receiving portion 19 of the support 17.

When the electronic module 7 has been locked onto the support 17, the support 17 can be inserted into the body 2 of the sensor 1. During this insertion, the locking portion 23 of the support comes into contact with the inner wall 2a of the body 2.

Similarly, the ribs 37 positioned on the cover 25 make it possible to lock the support 17 and to retain the electronic module 7 securely, to prevent it from moving in the support 17.

During the maintenance of the sensor 1, when the electronic module 7 has to be replaced, the support can be withdrawn from the body 2, after which the connecting protrusions 26 of the cover 25 can be detached from the securing protrusions 33a and 33b and the cover 25 can be pivoted to an open position PO. At his stage, the connecting pins 9 and the measurement pins 11 can be detached from the communication pins 5 of the support 17 and from the connectors 15 of the detection module 13. The electronic module 7 can then be withdrawn and repaired or replaced as necessary.

The support according to the invention is therefore a simple, reliable and effective solution for retaining an electronic module 7 securely in a sensor 1, notably when this sensor 1 is subject to considerable vibration, such as the vibration generated by a cylinder of a vehicle engine in operation.

It should also be noted that the present invention is not limited to the examples described above and can be varied in numerous ways within the capacity of those skilled in the art. Notably, the type and dimensions of the sensor 1, of the communication pins 5, of the connecting pins 9, of the measurement pins 11, of the electronic module 7, of the detection module 13, of the support 17, of the retaining means and of the attachment means used are not to be interpreted as limiting. In particular, it should be noted that the support according to the invention can be used in any other suitable type of sensor.

The invention claimed is:

1. A support (17) for an electronic module (7) for generating a signal, this module being intended to be inserted into a sensor (1) for measuring the pressure of the gases contained in a vehicle cylinder, said support (17) comprising a portion (19) for receiving said electronic module (7) and means (25) for retaining the electronic module (7) on said receiving portion (19), the electronic module (7) comprising a body (8), wherein the receiving portion (19) comprises means (31a, 31b) for attaching said retaining means (25), and the retaining means (25) are configured to pivot between an open position (PO) in which the electronic module (7) can be placed on the receiving portion (19) and a closed position (PF) in which the retaining means (25) are attached to the attachment means (31a, 31b) in order to retain the body (8) of the electronic module (7) on the support (17).

2. The support as claimed in claim 1, wherein the retaining means comprise at least one cover (25) configured to come into contact with a wall (29) of an electronic module (7).

3. The support as claimed in claim 2, wherein the retaining means comprise a single cover (25).

4. The support as claimed in claim 1, wherein the retaining means (25) are made in one piece with the support (17).

5. The support as claimed in claim 1, wherein the attachment means comprise at least one lug (31a, 31b) comprising a protrusion (33a, 33b) for securing the retaining means (25).

6. The support as claimed in claim 1, wherein the attachment means (31a, 31b) are made in one piece with the support (17).

7. The support as claimed in claim 1, wherein the retaining means (25) comprise at least one rib (37) arranged to lock the support (17) in a body (2) of a sensor (1).

8. The support as claimed in claim 1, further comprising means (31a, 35a, 35b) for positioning the electronic module (7).

9. A pressure measurement sensor (1) for a vehicle cylinder, said sensor (1) comprising a support (17) as claimed in claim 1 and an electronic module (13) for generating a pressure signal, mounted on said support between the retaining means (25) and the receiving portion (19).

10. A vehicle comprising an engine, at least one cylinder and at least one sensor (1) for measuring the pressure of the gases contained in said cylinder as claimed in the claim 9.

\* \* \* \* \*